United States Patent [19]

Wood et al.

[11] 4,373,041
[45] Feb. 8, 1983

[54] RUBBER COMPOSITIONS CONTAINING SILICA AND TACKIFIER RESINS

[75] Inventors: Jerold D. Wood; Carl J. Stacy, both of Bartlesville, Okla.

[73] Assignee: Phillips Petroleum Company, Bartlesville, Okla.

[21] Appl. No.: 316,163

[22] Filed: Oct. 29, 1981

[51] Int. Cl.$^3$ .................. C08L 93/00; C08L 47/00
[52] U.S. Cl. ........................ 524/77; 260/756; 524/270; 524/274; 524/271; 524/515; 524/518
[58] Field of Search .............. 260/756, 27 R, 27 BB; 525/99; 524/77, 515, 518, 270, 271, 274

[56] References Cited

U.S. PATENT DOCUMENTS

| | | | |
|---|---|---|---|
| 2,325,737 | 8/1943 | Boys | 260/756 |
| 2,756,220 | 7/1956 | Brooks et al. | 260/41.5 |
| 2,897,173 | 7/1959 | Boggs | 260/41.5 |
| 2,928,802 | 3/1960 | Rehner, Jr. et al. | 260/41.5 |
| 3,741,924 | 6/1973 | Okita et al. | 260/27 R |
| 4,151,157 | 4/1979 | Williams et al. | 260/756 |
| 4,192,790 | 3/1980 | McKinstry et al. | 260/756 |

OTHER PUBLICATIONS

Kraus-Degree of Cure in Filler-Reinforced Vulcanizates, I and II, Rubber World, Oct./Nov. 1956, pp. 67–73 and 254–259.

*Primary Examiner*—H. S. Cockeram

[57] ABSTRACT

Tackifying resins, such as rosin esters, hydrogenated rosin esters, and terpene resins, are used as promoters for silica-filled rubber compositions to improve the physical properties, such as tensile, hysteresis, etc., of the rubber.

22 Claims, No Drawings

RUBBER COMPOSITIONS CONTAINING SILICA AND TACKIFIER RESINS

This invention relates to rubber compositions exhibiting improved physical properties. In accordance with another aspect, this invention relates to the use of tackifying resins as reinforcing promoters for silica-filled rubber compositions. In accordance with a further aspect, this invention relates to silica-containing vulcanizable rubber compositions containing tackifying resins as reinforcing promoters. In still another aspect, this invention relates to products obtained by curing silica-containing vulcanizable rubber compositions having tackifying resins such as rosin esters, hydrogenated rosin esters or terpene resins as reinforcing promoters to yield rubber compositions exhibiting improved tensile and hysteresis properties.

BACKGROUND OF THE INVENTION

Carbon black has historically been the reinforcing agent of choice for rubber-based products such as tires and extruded and molded goods. Carbon black, which is produced by the thermal decomposition of oil and natural gases, greatly enhances mechanical strength and resistance to abrasion and has, in the past, been an economically attractive approach to improving the physical properties of rubber products. However, the increasing demand for other oil or gas derived petrochemicals, combined with the decreasing supply of oil and natural gas, has prompted searches for a carbon black replacement.

Reinforcing silica's higher costs and poorer performance has previously prevented it from competing with carbon black as a reinforcing filler for rubber. However, with recent and projected oil and gas price increases and with the development of new silica manufacturing processes, amorphous and fine particle size silicas have become available which are considered to be economically competitive with carbon black. A major effort to make reinforcing silica competitive with carbon black on a performance basis has evolved as a result of these changing economical factors. One approach is the incorporation into the rubber recipe of reinforcing promoters or coupling agents to effectively bond the silica to the rubber and, at the same time, obtain and/or improve the physical properties of the resulting rubber product.

Accordingly, an object of this invention is to provide novel reinforcing promoters.

Another object of this invention is to provide reinforced rubber compositions exhibiting improved properties.

A further object of this invention is to provide improved vulcanizable silica-containing rubber compositions.

A further object of this invention is to provide reinforcing promoters that will effectively bond the reinforcing materials to rubber.

Further objects, aspects, as well as the several advantages of the invention will be apparent to those skilled in the art upon reading the specification and the appended claims.

SUMMARY OF THE INVENTION

Broadly, the present invention comprises the use of minor, effective amounts of tackifying resins to significantly enhance the effectiveness of siliceous materials used as reinforcing fillers for rubber products.

More specifically, in accordance with the invention, vulcanizable rubber compositions are provided comprising a curable rubber polymer, a silica-based filler, optionally a thioalkoxy-silane coupling agent, and a minor effective amount of a tackifying resin, such as rosin esters, hydrogenated rosin esters, and terpene resins, as reinforcing promoters to aid in effectively bonding the silica-based filler to the rubber upon curing and, at the same time, improving the physical properties such as tensile and hysteresis of the resulting rubber product.

Suitable tackifying resins that can be employed, according to the invention, include rosin esters and hydrogenated rosin esters, such as those listed in *Encyclopedia of Polymer Science and Technology*, Volume 12 (1970), pages 139–146, and terpene resins, such as those described in *Encyclopedia of Science and Technology*, Volume 13 (1970) pages 575–588.

The rosin ester and hydrogenated rosin ester tackifiers suitable for use in this invention can be characterized as esters of abietic acid, levopimaric acid, pimaric acid, and the like, and their hydrogenated and perhydrogenated forms. The presently preferred tackifiers of this group are a glycerol ester of hydrogenated rosin having a softening point of 82° C. and an acid number of 9 marketed as Foral 85 by Hercules, Inc., and a pentaerythritol ester of hydrogenated rosin having a softening point of 104° C. and an acid number of 12 marketed as Foral 105 by Hercules, Inc.

The terpene resin tackifiers suitable for this invention can be characterized as homo- and copolymers of alpha-pinene, beta-pinene, dipentene (e.g., d or d,1-limonene), beta-pellandrene, and similar hydrocarbons found in turpentine. The presently preferred tackifiers of this group are a dipentene polyterpene having a softening point of 100° C. and an acid number of less than 1.0 marketed as Wingtack 95 by Goodyear Chemicals, and an alpha-pinene polymer having a softening point of 115° C. and an acid number of less than 1.0 marketed by Harwick, Inc. under the tradename of Piccolyte Alpha-115.

The amount of tackifying resin promoter used in this invention is a promoting amount sufficient to effectively bond the silica-containing reinforcing material to the rubber and improve the physical properties of the resulting rubber product including tensile, hysteresis, and the like. Generally, this amount will be within the broad range of about 2 to about 30 phr (parts by weight per hundred parts of rubber) with a preferred range of about 8 to about 12 phr.

The rubber component of this invention can be of any type although it is preferred that the rubber be subject to a sulfur-type vulcanization and as such should have some degree of unsaturation. Typical rubbers useful in this invention include natural rubber, homopolymers or copolymers of conjugated dienes, copolymers of conjugated dienes, and monovinylarenes, which would include emulsion and solution polymerized rubbers, terpolymers of ethylene, propylene, and a non-conjugated diolefin, butyl rubber, and nitrile rubber. The polymers can be linear or branched. The conjugated dienes suitable are those which ordinarily contain 4 to about 12 carbon atoms per molecule with those containing 4 to about 8 carbon atoms being preferred and are exemplified by 1,3-butadiene, isoprene, piperylene, 2,3-dimethyl-1,3-butadiene, 3-butyl-1,3- octadiene, 2-phenyl-1,3- butadiene, and the like, and mixtures thereof. The monovinylarenes suitable are those which ordinarily contain 8 to about 16 carbon atoms per molecule and are exemplified by styrene, alpha-methyl styrene, 3-methyl styrene, 4-n-propyl styrene, 4-p-tolyl styrene, 1-vinyl naphthalene, and the like, and mixtures thereof.

The reinforcing fillers suitable for use in this invention include any type of silica-containing material which is considered to have reinforcing properties. These are often described as siliceous fillers and refer to fillers which are rubber compatible or can be worked into rubber mixtures, said fillers consisting of silicates or silica or contains silicas or silica and/or contain chemically bound silicates (or silica) in the widest sense including mixtures of two or more siliceous fillers.

Suitable siliceous fillers include:

1. Highly dispersed silica (silicon dioxide) having a specified surface area in the range of about 5 to about 1,000, preferably about 20 to about 300 m$^2$/g (determined with gaseous nitrogen according to the known BET procedure) and with primary particle sizes in the range of about 5 to about 500 nm (nanometer, $10^{-9}$ meters) which can be produced, for example, by precipitation from solution of silicates by hydrolysis and/or oxidative high temperature conversion. There can also be used flame hydrolysis of volatile silicon halides, e.g., silicon tetrachloride or electric arc processes. These silicas, in a given case, can also be present as mixed oxides or oxide mixtures with oxides of the metals aluminum (alumina), magnesium (magnesium oxide), calcium (calcium oxide), barium (barium oxide), zinc (zinc oxide), zirconium (e.g., zirconium dioxide) or titanium (e.g., titanium dioxide).

2. Synthetic silicates, for example, aluminum silicate or alkaline earth silicate such as magnesium or calcium silicate with specific surface areas of about 20 to about 400 m$^2$/g and primary particle sizes of about 10 to about 400 nm.

3. Natural silicates, for example, kaolin, wollastonite, talc, and asbestos as well as natural silicas, e.g., quartz or sand.

Typical commercially available and suitable examples of silica for use in the invention include Hi-Sil 233® (PPG Industries), Ultra-Sil® and Aero-Sil® (Degussa) and Cabo-Sil® (Cabot Corp.). Generally, precipitated grade silica is the preferred filler due to favorable costs.

The siliceous fillers can be added in an amount sufficient to reinforce the rubbery polymer and provide a final rubber product of desirable properties. Generally, the amount of filler will range from about 5 to about 150 parts by weight per hundred parts by weight of rubber (phr).

The thioalkoxy-silane coupling agents that can be employed in the inventive compositions are compounds having the following general structures:

(a) (OR)$_3$Si-R$^1$-SH, wherein R and R$^1$ are aliphatic or cycloaliphatic radicals having from 1 to 10 carbon atoms preferably 1 to 4 carbon atoms; for example: 3-mercaptopropyltrimethoxysilane, 3-mercaptopropyltriethoxysilane, 2-mercaptoethyltrimethoxysilane, and the like.

(b) (OR)$_3$ Si-R$^1$-S$_n$-R$^2$-Si(OR)$_3$, wherein R, R$^1$ and R$^2$ are aliphatic or cycloaliphatic radicals having from 1 to 10 carbon atoms, preferably 1 to 4 carbon atoms, and n is a whole number ranging from 2 to 4; for example: bis(3-trimethoxysilylpropyl) disulfide, bis(2-trimethoxysilylpropyl) tetrasulfide, bis(2-triethoxysilylpropyl) trisulfide, and the like, and other examples disclosed in U.S. Pat. No. 3,873,489, hereby incorporated as reference. Mixtures of the above-defined compounds can be used if desired.

The preferred thioalkoxy-silane coupling agent is bis(3-triethoxysilylpropyl) tetrasulfide, employed at a level of about 1.0 to 2.0, most preferably about 1.5, parts by weight per 100 parts by weight of rubber. It should be understood, however, that the amount of coupling agent employed can vary appreciably and will be sufficient to provide a coupling effect and a final rubbery product having desirable properties.

Appropriate compounding ingredients which are well known in the rubber industry can also be employed in the rubber composition of this invention. These include accelerators, vulcanizing agents such as sulfur and sulfur yielding compounds, antioxidants, antiozonants, light stabilizers, other fillers, processing aids, and the like.

Industrial fields of use for the described rubber mixtures include, for example, industrial rubber articles such as cable insulation, hoses, driving belts, V-belts, conveyor belts, roller coating, vehicle tire treads, tire carcasses, tire sidewalls, cross country tires, shoe sole materials, packing rings, damping elements, and many others.

The rubbery composition formulation used in this invention is considered conventional. The formulations used for evaluation are shown in Recipes 1 and 2.

The following examples serve to illustrate the use of selected tackifying resins as reinforcing promoters in silica-filled sulfur vulcanized rubber compositions.

The inventive rubber compositions can be prepared by any suitable mixing means, such as a roll mill, preferably by incremental addition of the ingredients as described in Example I. Vulcanization of the inventive rubber compounds can be accomplished by compression molding, preferably at 155° C. for about 30 minutes.

EXAMPLE I

In this example, the compounding and vulcanization of silica-filled rubber compositions containing hydrogenated rosin esters as silica reinforcement promoters is described. Rubber compounds were prepared according to Recipe I.

| | Recipe I | | | | | |
|---|---|---|---|---|---|---|
| | Run 1 (Invention) | Run 2 (Invention) | Run 3 (Control) | Run 4 (Invention) | Run 5 (Invention) | Run 6 (Control) |
| SBR 1500,[a] parts by weight | 40 | 40 | 40 | 40 | 40 | 40 |
| Hi Sil 233,[b] parts by weight | 16 | 16 | 16 | 16 | 16 | 16 |
| Si-69,[c] parts by weight | 0 | 0 | 0 | 0.6 | 0.6 | 0.6 |
| Foral-69,[d] parts by weight | 4.0 | 0 | 0 | 4.0 | 0 | 0 |
| Foral-105,[e] parts by weight | 0 | 4.0 | 0 | 0 | 4.0 | 0 |
| ZnO, parts by weight | 1.6 | 1.6 | 1.6 | 1.6 | 1.6 | 1.6 |
| Stearic acid, parts by | | | | | | |

| | Recipe I | | | | | |
|---|---|---|---|---|---|---|
| | Run 1 (Invention) | Run 2 (Invention) | Run 3 (Control) | Run 4 (Invention) | Run 5 (Invention) | Run 6 (Control) |
| weight Sulfur, parts by weight | 0.8 | 0.8 | 0.8 | 0.8 | 0.8 | 0.8 |
| DPG,(f) parts by weight | 1.1 | 1.1 | 1.1 | 1.1 | 1.1 | 1.1 |
| Altax,(g) parts by weight | 0.6 | 0.6 | 0.6 | 0.6 | 0.6 | 0.6 |
| | 0.6 | 0.6 | 0.6 | 0.6 | 0.6 | 0.6 |

(a)an emulsion polymerized butadiene-styrene rubber with a bound styrene content of about 23.5 weight-% and a nominal Mooney viscosity of 52 at 212° F.;
(b)precipitated, amorphous, hydrated silica having a specific gravity of 2.0, a surface area (BET method) of 140-160 m²/g, less than 0.5% retained on a 325-mesh screen, average particle diameter of 0.022 microns; marketed by PPG Industries;
(c)bis(3-triethyoxysilylpropyl) tetrasulfide, a silica-rubber coupling agent; marketed by Degussa, Wesseling, Germany;
(d)a glycerol ester of hydrogenated rosin having a softening point (determined by the Hercules drop method) of 82° C., an acid number of 9, and a USDA rosin scale color of X, marketed by Hercules, Inc.,;
(e)a pentaerythritol ester of hydrogenated rosin having a softening point (determined by the Hercules drop method) of 104° C., and acid number of 12, and a USDA rosin scale color of WW; marketed by Hercules, Inc.;
(f)diphenyl-guanidine, a secondary accelerator marketed by Harwick Chemical Co.;
(g)benzothiazyl disulfide, a primary accelerator marketed by R. T. Vanderbilt.

The ingredients of the rubber compositions were compounded on a roll mill having a 2" diameter according to the following procedure: mill rubber for 1 minute at 150° F., add silica and mill for 10 minutes at 150° F., add tackifier resins (hydrogenated rosin esters) and mill at 250° F. for 3 minutes, allow to cool and add Si-69 and mill for 2 minutes, and finally add curing agents and mill for 5 minutes at about 150° F. The compound was remilled with three tight passes for 3 minutes.

Milled rubber compounds were vulcanized in a compression mold at 155° C. for 30 minutes. Tensile and swelling data were determined on 6"×6" slabs having a thickness of 24 mils.

EXAMPLE II

Properties of vulcanized, silica-filled rubber compounds prepared according to the procedures described in Example I are summarized in Table I.

TABLE I

| | Run 1 (Invention) | Run 2 (Invention) | Run 3 (Control) | Run 4 (Invention) | Run 5 (Invention) | Run 6 (Control) |
|---|---|---|---|---|---|---|
| Hysteresis ΔT,(a) °C. | 29.6 | 28.5 | 33.1 | 20.8 | 20.6 | 26.6 |
| Resilience,(b) % | 69.9 | 69.0 | 71.0 | 74.0 | 74.5 | 73.4 |
| 300% Modulus,(c) psi | 690 | 603 | 780 | 1546 | 1567 | 2009 |
| Tensile Strength,(c) psi | 2984 | 3254 | 2548 | 3493 | 3167 | 2414 |
| Elongation,(c) % | 685 | 753 | 587 | 520 | 480 | 350 |
| Shore A Hardness(d) | 57 | 58 | 69 | 62 | 63 | 73 |
| Minimum Mooney(e) | 37.0 | 36.0 | 53.4 | 37.5 | 36.0 | 41.7 |
| 5-Pt. Scorch,(e) min. | 16.5 | 16.5 | 13.8 | 12.3 | 13.4 | 11.0 |
| $\nu \times 10^4$,(f) moles/cc | 2.20 | 2.07 | 2.40 | 2.95 | 2.82 | 3.50 |

(a)determined according to ASTM D 623, Method A, by means of a Goodrich flexometer using a modified specimen size of 0.7" diameter and 1.0" height.
(b)determined according to ASTM D 945; same specimen size as for (a).
(c)determined according to ASTM D 412, Method A, employing a CRE-2K tensile machine, at 78° F.
(d)determined according to ASTM D 2240, Shore durometer, Type A.
(e)determined according to ASTM D 1646; rotor diameter: 30.48 mm, scorch time was determined for a 5 point rise above minimum Mooney at 140° C.
(f)determined according to the fast swell method described in Rubber World, Vol. 135 (1956), pages 67 and 254, using 6 × 6" slabs of 24 mil thickness which are immersed in n-heptane for 2 hours at 60° C. and 3 hours at 30° C.; the higher the greater the amount of rubber-rubber and rubber-filler cross-linking.

Data in Table I show lower hysteretic heat generation and higher tensile strength and elongation of silica-filled rubber compounds (with and without Si-69 silane coupling agent) containing Foral tackifiers versus control runs without said tackifiers. An additional processing benefit of the addition of hydrogenated rosin esters to silica-filled rubber was a longer time to scorch and a lower minium Mooney viscosity. My inventive rubber compounds were generally softer than the corresponding control rubbers.

EXAMPLE III

This example discloses the addition of two terpene resins to silica-filled styrene-butadiene rubber compounds. Rubber compounds were prepared according to Recipe II and the milling and vulcanization procedures described in Example I.

| | Recipe II | | | | | |
|---|---|---|---|---|---|---|
| | Run 7 (Invention) | Run 8 (Invention) | Run 3 (Control) | Run 9 (Invention) | Run 10 (Invention) | Run 6 (Control) |
| HBR 1500, parts by weight | 40 | 40 | 40 | 40 | 40 | 40 |
| Hi Sil 233, parts by weight | 16 | 16 | 16 | 16 | 16 | 16 |
| Si-69, parts by weight | 0 | 0 | 0 | 0.6 | 0.6 | 0.6 |
| Wingtack-95(a), parts by weight | 4.0 | 0 | 0 | 4.0 | 0 | 0 |
| Piccolyte A-115,(b) parts by weight | 0 | 4.0 | 0 | 0 | 4.0 | 0 |
| ZnO, parts by weight | 1.6 | 1.6 | 1.6 | 1.6 | 1.6 | 1.6 |
| Stearic Acid, parts by weight | 0.8 | 0.8 | 0.8 | 0.8 | 0.8 | 0.8 |
| Sulfur, parts by weight | 1.1 | 1.1 | 1.1 | 1.1 | 1.1 | 1.1 |
| DPG, parts by weight | 0.6 | 0.6 | 0.6 | 0.6 | 0.6 | 0.6 |
| Altax, parts by | | | | | | |

-continued

Recipe II

|  | Run 7 (Invention) | Run 8 (Invention) | Run 3 (Control) | Run 9 (Invention) | Run 10 (Invention) | Run 6 (Control) |
|---|---|---|---|---|---|---|
| weight | 0.6 | 0.6 | 0.6 | 0.6 | 0.6 | 0.6 |

(a) a synthetic dipentene polyterpene resin having a Ring and Ball softening point of 100° C. and a Gardner color number (50% in toluene) of 3, an acid number of less than 1.0, a specific gravity of 0.93, and a molecular weight of about 1200, marketed by Goodyear Chemicals Co.
(b) a poly(alpha-pinene) resin having a softening point of 115° C., a Gardner color number of 4, an acid number of less than 1.0, and a specific gravity of 0.97, marketed by Harwick, Akron, Ohio.

EXAMPLE IV

Properties of vulcanized, silica-filled rubber compounds containing terpene resins as silica reinforcement promoting agents are summarized in Table II.

TABLE II

|  | Run 7 (Invention) | Run 8 (Invention) | Run 3 (Control) | Run 9 (Invention) | Run 10 (Invention) | Run 6 (Control) |
|---|---|---|---|---|---|---|
| Hysteresis ΔT, °C. | 31.0 | 28.0 | 33.1 | 24.7 | 21.8 | 26.6 |
| Resilience, % | 65.7 | 69.5 | 71.0 | 71.0 | 74.3 | 73.4 |
| 300% Modulus, psi | 717 | 650 | 780 | 1430 | 1456 | 2009 |
| Tensile Strength, psi | 2867 | 1376 | 2548 | 3501 | 3824 | 2414 |
| Elongation, % | 670 | 490 | 587 | 540 | 555 | 350 |
| Shore A Hardness | 62 | 60 | 69 | 66 | 65 | 73 |
| Minimum Mooney | 40.5 | 42.5 | 53.4 | 37.0 | 36.5 | 41.7 |
| 5 PT. Scorch, min. | 15.1 | 11.9 | 13.8 | 12.0 | 11.2 | 11.0 |
| $\nu \times 10^4$, moles/cc | 2.20 | 2.07 | 2.40 | 2.82 | 2.90 | 3.50 |

For details of testing procedures see footnotes of Table I.

Test data in Table II show that most inventive silica filled rubber compositions, especially those containing Si-69 silane coupling agent (Runs 9 and 10), showed lower hysteretic heat generation, higher tensile strength, higher elongation, lower Mooney viscosity, slightly longer time to scorch, and lower Shore A hardness than control compounds without terpene resins.

We claim:

1. A silica-containing vulcanizable composition comprising
   (a) a vulcanizable natural or synthetic rubber,
   (b) a siliceous filler in an amount ranging from about 5 to about 150 parts by weight per hundred parts by weight of rubber (phr), and
   (c) at least one tackifying resin selected from rosin esters, hydrogenated rosin esters, and terpene resins in a minor but effective amount sufficient to increase the bonding of said siliceous filler to said rubber and improve the physical properties of the resulting rubber product, including tensile, hysteresis, and the like.

2. A composition according to claim 1 which additionally contains (d) a thioalkoxy-silane coupling agent.

3. The product obtained by curing the composition of claim 1.

4. A composition according to claim 1 wherein (a) is a polymer of a conjugated diene.

5. A composition according to claim 1 wherein (a) is a sulfur curable polymer and the composition includes sulfur or a sulfur yielding material.

6. A cured product of claim 5.

7. A composition according to claim 1 including sulfur, a cure accelerator, processing aids, and light and ozone stabilizers.

8. A composition according to claim 1 wherein, based upon 100 parts of (a), the amount of (b) present ranges from about 20 to about 80 phr and the amount of (c) ranges from about 2 to about 30 phr.

9. A composition according to claim 1 wherein (a) is a butadiene/styrene copolymer, (b) is a precipitated hydrated silica, and (c) is a glycerol ester of hydrogenated rosin.

10. A composition according to claim 1 wherein (a) is a butadiene/styrene copolymer, (b) is a precipitated hydrated silica, and (c) is a pentarythritol ester of hydrogenated rosin.

11. A composition according to claim 1 wherein (a) is a butadiene/styrene copolymer, (b) is a precipitated hydrated silica, and (c) is a synthetic dipentene polyterpene resin having a softening point of about 100° C., an acid number of less than one (1), and a molecular weight of about 1200.

12. A composition according to claim 1 wherein (a) is a butadiene/styrene copolymer, (b) is a precipitated hydrated silica, and (c) is a poly(alpha-pinene) resin having a softening point of about 115° C., an acid number of less than one (1), and a specific gravity of about 0.97.

13. A process for enhancing the effectiveness of silica-containing materials as reinforcing fillers and the physical properties of vulcanizable rubber compositions containing same which comprises effectively bonding said silica-containing material to the rubber by incorporating therein a promoting amount of at least one tackifying resin selected from rosin esters, hydrogenated rosin esters, and terpene resins, which amount is sufficient to improve the tensile and hysteresis and other physical properties of the rubber.

14. A process according to claim 13 wherein the amount of tackifying resin incorporated into the rubber composition ranges from about 2 to about 30 phr.

15. A process according to claim 13 wherein the rubber is a conjugated diene rubber.

16. A process according to claim 13 wherein said rubber is a butadiene/styrene copolymer and said silica is a precipitated hydrated silica.

17. A process according to claim 16 wherein said tackifying resin is a glycerol ester of hydrogenated rosin.

18. A process according to claim 16 wherein said tackifying resin is a pentarythritol ester of hydrogenated rosin.

19. A process according to claim 16 wherein said tackifying resin is a synthetic dipentene polyterpene resin having a softening point of about 100° C., an acid number of less than one (1), and a molecular weight of about 1200.

20. A process according to claim 16 wherein said tackifying resin is a poly(alpha-pinene) resin having a softening point of about 115° C., an acid number of less than one (1), and a specific gravity of about 0.97.

21. A composition according to claim 1 wherein said tackifying resin is a hydrogenated rosin ester.

22. A composition according to claim 1 wherein said tackifying resin is a terpene resin.

* * * * *